(12) United States Patent
Ishizaki

(10) Patent No.: US 9,341,338 B2
(45) Date of Patent: May 17, 2016

(54) LIGHT DISTRIBUTION-CONTROLLING DEVICE OF VEHICLE HEADLIGHT

(75) Inventor: Masaru Ishizaki, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 13/980,934

(22) PCT Filed: Jan. 6, 2012

(86) PCT No.: PCT/JP2012/050156
§ 371 (c)(1),
(2), (4) Date: Jul. 22, 2013

(87) PCT Pub. No.: WO2012/102065
PCT Pub. Date: Aug. 2, 2012

(65) Prior Publication Data
US 2013/0294100 A1    Nov. 7, 2013

(30) Foreign Application Priority Data

Jan. 24, 2011    (JP) .................................. 2011-011941

(51) Int. Cl.
*B60Q 1/00* (2006.01)
*F21S 8/10* (2006.01)
*B60Q 1/14* (2006.01)

(52) U.S. Cl.
CPC ............. *F21S 48/1705* (2013.01); *B60Q 1/143* (2013.01); *B60Q 2300/21* (2013.01)

(58) Field of Classification Search
CPC ............................... B60Q 1/14; F21S 48/1705
USPC ......................... 362/466, 464, 465
See application file for complete search history.

(56) References Cited

U.S. PATENT DOCUMENTS 6,049,749 A  *  4/2000  Kobayashi ...................... 701/49
6,481,876 B2 * 11/2002  Hayami et al. ................ 362/464
(Continued)

FOREIGN PATENT DOCUMENTS

DE    102006018667 A1    10/2007
JP         7-15432         3/1995
(Continued)

OTHER PUBLICATIONS

International Search Report.
(Continued)

*Primary Examiner* — Evan Dzierzynski
*Assistant Examiner* — Matthew Peerce
(74) *Attorney, Agent, or Firm* — Rankin, Hill & Clark LLP

(57) ABSTRACT

A light distribution-controlling device of a vehicle headlight includes headlight lamp bodies, light distribution operation switches, a front detection unit, a manual mode control unit that controls the light distribution of the headlight lamp body based on a signal outputting from the light distribution operation switch, an auto mode control unit that controls the light distribution of the headlight lamp body based on a signal output from the front detection unit, an auto mode changeover switch that switches control of the light distribution of the headlight lamp body to control by the auto mode control unit, a passing continuation-determining unit that determines whether a continuation time of an ON operation of a passing switch is more than or equal to a threshold continuation time, and an auto mode-returning unit that returns the control of the light distribution to the control by the auto mode control unit.

4 Claims, 7 Drawing Sheets

(56) References Cited

U.S. PATENT DOCUMENTS

| | | | |
|---|---|---|---|
| 6,825,469 | B2 | 11/2004 | Yamaguchi et al. |
| 7,575,348 | B2* | 8/2009 | Hasegawa ................... 362/466 |
| 7,625,107 | B2* | 12/2009 | Brod .................. B60Q 1/1415 362/464 |
| 7,755,294 | B2* | 7/2010 | Shelton et al. ................. 315/80 |
| 7,759,819 | B2* | 7/2010 | Michiyama .......... B60Q 1/1423 200/61.54 |
| 7,973,484 | B2* | 7/2011 | Albrecht .............. B60Q 1/1423 307/10.8 |
| 8,045,760 | B2* | 10/2011 | Stam et al. ................... 382/104 |
| 8,115,394 | B2* | 2/2012 | Kobayashi ..................... 315/82 |
| 8,425,092 | B2* | 4/2013 | Kobayashi .................... 362/466 |
| 8,511,872 | B2* | 8/2013 | Schmidt et al. ............... 362/466 |
| 8,538,636 | B2* | 9/2013 | Breed ............................. 701/49 |
| 8,636,392 | B2* | 1/2014 | Ehlgen et al. ................ 362/466 |
| 8,853,946 | B2* | 10/2014 | Wolski ................ B60Q 1/1423 315/82 |
| 2003/0123705 | A1 | 7/2003 | Stam et al. |
| 2003/0123706 | A1* | 7/2003 | Stam et al. .................... 382/104 |
| 2005/0169000 | A1* | 8/2005 | Hasegawa ............. B60Q 1/085 362/466 |
| 2006/0018512 | A1* | 1/2006 | Stam et al. .................... 382/104 |
| 2006/0177098 | A1 | 8/2006 | Stam |

FOREIGN PATENT DOCUMENTS

| | | |
|---|---|---|
| JP | 2004-500279 | 1/2004 |
| JP | 2007-091023 | 4/2007 |
| WO | 01/70538 | 9/2001 |
| WO | 2004/076231 A2 | 9/2004 |

OTHER PUBLICATIONS

European Search Report, Application No. 12740021.6, dated Oct. 7, 2014, 7 pages.

Chinese Office Action with English Translation dated Mar. 9, 2015, 16 pages.

* cited by examiner

LIGHT DISTRIBUTION-CONTROLLING DEVICE OF VEHICLE HEADLIGHT

BACKGROUND OF THE INVENTION

1. Field of the Invention

The present invention relates to a light distribution-controlling device of a vehicle headlight that switches light distribution of a headlight lamp body to any one of a low beam state and a high beam state.

Priority is claimed on Japanese Patent Application No. 2011-011941, filed Jan. 24, 2011, the content of which is incorporated herein by reference.

2. Description of Related Art

As a vehicle headlight, a headlight including a light distribution-controlling device that automatically switches light distribution of a headlight lamp body according to the presence or absence of a preceding vehicle or an oncoming vehicle is known (For example, see Japanese Unexamined Patent Application, First Publication No. 2007-091023).

In the light distribution-controlling device disclosed in Japanese Unexamined Patent Application, First Publication No. 2007-091023, a manual operation switch and an auto mode changeover switch are provided in a switch lever that is projected at a position close to a steering. In this device, when the auto mode changeover switch is turned on, a control unit automatically controls light distribution. In a vehicle, a camera for photographing a forward vehicle and a control unit are mounted, and signals output from the camera are input to the control unit. The control unit maintains light distribution of a headlight lamp body at a high beam state while a signal indicating the presence of the forward vehicle is not input from the camera, and when the signal indicating the presence of the forward vehicle is input from the camera, the control unit switches the light distribution of the headlight lamp body to a low beam state. In addition, at the time of auto mode control, when a light distribution-switching operation is performed by a driver, the control unit terminates the control by an auto mode and shifts to manual mode control.

However, in the light distribution-controlling device in the related art, when the manual operation is performed once at the time of auto mode control, the control by an auto mode is switched to the control by a manual mode thereafter completely. For this reason, in order to return to the control by an auto mode again, the auto mode changeover switch should be turned off once, and then turned on again. Therefore, in the case of the light distribution-controlling device in the related art, the operation when returning to the control by an auto mode is cumbersome, and an improvement in this respect is desired.

SUMMARY OF THE INVENTION

Therefore, this invention provides a light distribution-controlling device of a vehicle headlight in which a manual mode is easily returned to an auto mode control without requiring any complicated operation, after the auto mode is switched to the manual mode by a manual operation of a light distribution operation switch during the auto mode control.

In order to solve the problem described above, a light distribution-controlling device of a vehicle headlight according to a first aspect of the present invention, includes: a headlight lamp body that switches light distribution to any one of a low beam state and a high beam state; a light distribution operation switch that includes a passing switch having a momentary mechanism, and switches light distribution of the headlight lamp body by a driver's operation; a front detection unit that detects an object in front of an own vehicle; a manual mode control unit that controls the light distribution of the headlight lamp body based on a signal output from the light distribution operation switch; an auto mode control unit that controls the light distribution of the headlight lamp body based on a signal output from the front detection unit; an auto mode changeover switch that switches control of the light distribution of the headlight lamp body to control by the auto mode control unit by the driver's operation; a passing continuation-determining unit that determines whether a continuation time of an ON operation of the passing switch is more than or equal to a threshold continuation time; and an auto mode-returning unit that returns the control of the light distribution to the control by the auto mode control unit when the continuation time is determined to be more than or equal to the threshold continuation time by the passing continuation-determining unit after the control of the light distribution by the auto mode control unit is switched to control of the light distribution by the manual mode control unit by an operation on the light distribution operation switch in a case in which the auto mode changeover switch is in an ON state.

Therefore, when the passing switch having the momentary mechanism is turned on by a user for the threshold continuation time or more after the control by the auto mode control unit is switched to the control by the manual mode control unit by the driver's operation on the light distribution operation switch during the auto mode control, the auto mode-returning unit returns the control of the light distribution to the control by the auto mode control unit.

In the light distribution-controlling device of the first aspect, the light distribution-controlling device of a vehicle headlight of a second aspect of the invention may further includes a non-operation time-determining unit that determines whether a non-operation time during which the light distribution operation switch is not continuously operated is more than or equal to a threshold time, wherein the auto mode-returning unit returns the control of the light distribution to the control by the auto mode control unit when the non-operation time is determined to be more than or equal to the threshold time by the non-operation time-determining unit after the control of the light distribution by the auto mode control unit is switched to the control of the light distribution by the manual mode control unit by the operation on the light distribution operation switch in the case in which the auto mode changeover switch is in the ON state.

Therefore, when the non-operation time during which the light distribution operation switch is not continuously operated is more than or equal to the threshold time after the control by the auto mode control unit is switched to the control by the manual mode control unit by the driver's operation of the light distribution operation switch during the auto mode control, the auto mode-returning unit returns the control of the light distribution to the control by the auto mode control unit.

In the light distribution-controlling device of the first or second aspect, the light distribution-controlling device of a vehicle headlight of a third aspect of the invention further includes a non-operation travel distance determining unit that determines whether a travel distance of the own vehicle while the light distribution operation switch is not operated is more than or equal to a threshold distance, wherein the auto mode-returning unit returns the control of the light distribution to the control by the auto mode control unit when the travel distance is determined to be more than or equal to the threshold distance by the non-operation travel distance determining unit after the control by the auto mode control unit is switched to the control of the light distribution by the manual mode control unit by the operation on the light distribution operation switch in the case in which the auto mode changeover switch is in the ON state.

Therefore, when the travel distance of the own vehicle during non-operation of the light distribution operation switch is more than or equal to the threshold distance after the control by the auto mode control unit is switched to the control by the manual mode control unit by the driver's operation of the light distribution operation switch during the auto mode control, the auto mode-returning unit returns the control of the light distribution to the control by the auto mode control unit.

Advantageous Effects of Invention

According to the first aspect of the invention, since the auto mode-returning unit, that returns the control of the light distribution to the control by the auto mode control unit when the continuation time of the ON operation of the passing switch is more than or equal to the threshold continuation time, is provided, it is therefore possible to easily return to the auto mode control only by turning on the passing switch by the driver for the threshold continuation time or more after the control by the auto mode control unit is switched to the control by the manual mode control unit by the driver's operation of the light distribution operation switch during the auto mode control.

According to the second aspect of the invention, the auto mode-returning unit automatically returns to the auto mode control when the non-operation time during which the light distribution operation switch is not continuously operated is more than or equal to the threshold time. Therefore, it is possible to further reduce the driver's labor and time for operation.

According to the third aspect of the invention, the auto mode-returning unit automatically return to the auto mode control when the travel distance of the own vehicle during non-operation of the light distribution operation switch is more than or equal to the threshold distance. Therefore, it is possible to further reduce the driver's labor and time for operation.

DETAILED DESCRIPTION OF THE INVENTION

Hereinafter, an embodiment of the present invention will be described referring to the accompanying drawings.

Figure 1:
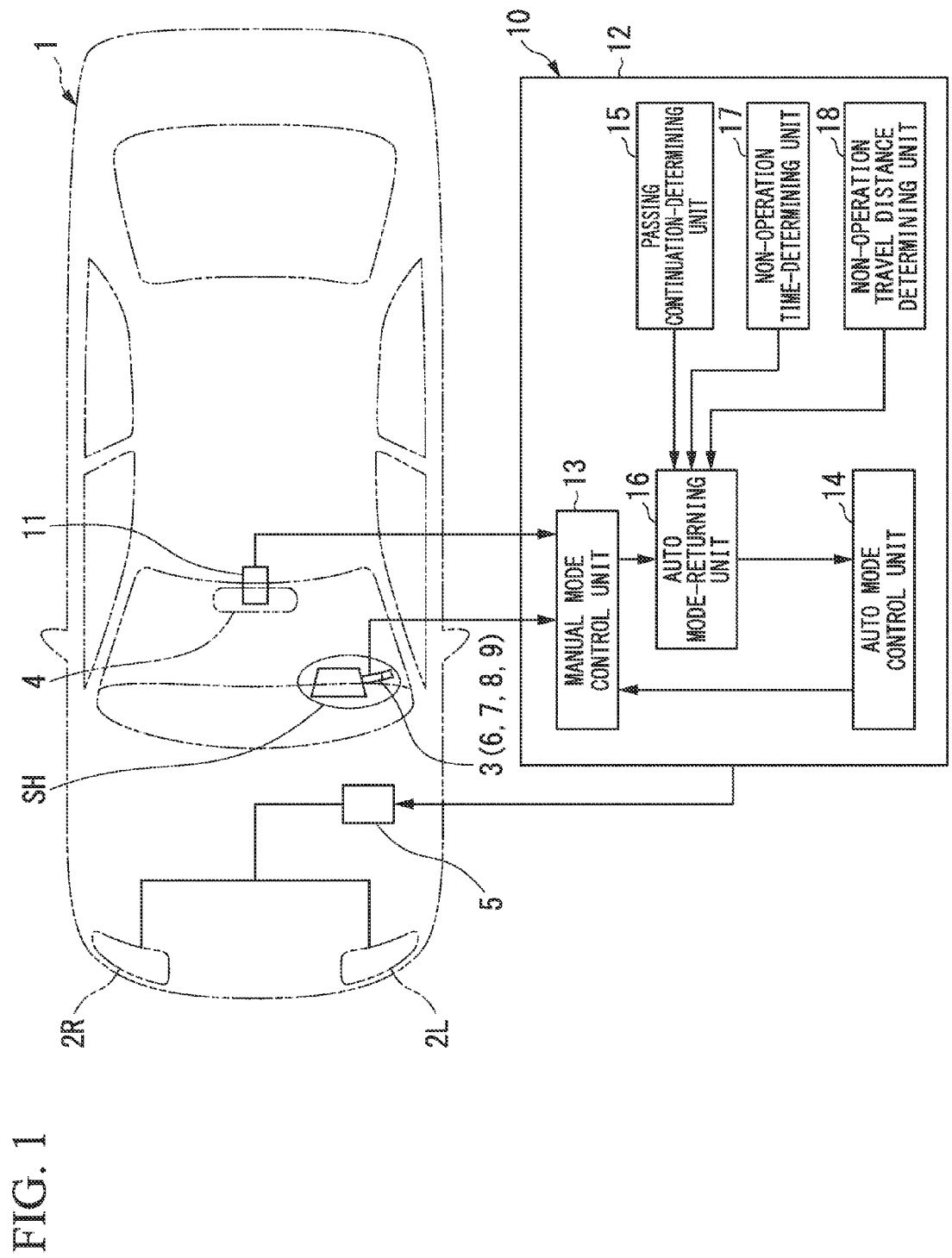
FIG. 1 is a schematic configuration diagram illustrating a vehicle including a light distribution-controlling device of a vehicle headlight according to an embodiment of the present invention.

FIG. 1 is a schematic configuration diagram illustrating a vehicle 1 that adopts a light distribution-controlling device 10 of a vehicle headlight according to an embodiment of the present invention. In FIG. 1, numeral values 2L and 2R denote headlight lamp bodies of left and right headlights, a numeral value 3 denotes a switch lever that is projected at a position close to a steering wheel SH, and a numeral value 4 denotes a room mirror provided on the ceiling portion of a driver's seat. Each of the headlight lamp bodies 2L and 2R may be appropriately switched to a low beam state and a high beam state (light distribution) through a relay 5. In addition, in the switch lever 3, mainly a plurality of headlight-related switches and the like, for example, a main lighting switch 6 which will be described in detail later, an auto mode changeover switch 7, a high/low changeover switch 8 (light distribution operation switch), a passing switch 9 (light distribution operation switch), and so on are collectively arranged.

The light distribution-controlling device 10 includes the headlight lamp bodies 2L and 2R, the switches 6, 7, 8, and 9 which are provided on the switch lever 3, an imaging camera 11 (front detection unit) that is provided at the room mirror 4 and so on and detects an object (mainly, preceding vehicle or oncoming vehicle) in front of a vehicle, and a controller 12 that receives signals from the switches 6, 7, 8, and 9 provided on the switch lever 3 and the imaging camera 11 and then controls light distribution of the headlight lamp bodies 2L and 2R.

The controller 12 includes a manual mode control unit 13 and an auto mode control unit 14. The manual mode control unit 13 controls the light distribution of the headlight lamp bodies 2L and 2R based only on a driver's operation on the switches 6, 7, 8, and 9. The auto mode control unit 14 automatically controls the light distribution of the headlight lamp bodies 2L and 2R based on signals output from the imaging camera 11 when the auto mode changeover switch 7 provided on the switch lever 3 is in an ON state.

In control of light distribution by the auto mode control unit 14 (hereinafter, referred to as "auto mode control"), the light distribution of the headlight lamp bodies 2L and 2R is maintained in a high beam state while a signal indicating a preceding vehicle or an oncoming vehicle is not input from the imaging camera 11, and the light distribution of the headlight lamp bodies 2L and 2R is switched to a low beam state when the signal indicating the preceding vehicle or the oncoming vehicle is input from the imaging camera 11. However, when the passing switch 9 or the high/low changeover switch 8 is operated by a driver even during the auto mode control, an operation by the driver has priority, and then control of the light distribution is shifted from the auto mode control to control by the manual mode control unit 13 (hereinafter, referred to as "manual mode control").

In addition, the controller 12 includes a passing continuation-determining unit 15 and an auto mode-returning unit 16. The passing continuation-determining unit 15 measures a continuation time of an ON operation of the passing switch 9, and determines whether the measured continuation time is more than or equal to a threshold continuation time. When the passing continuation time is determined to be more than or equal to the threshold continuation time by the passing continuation-determining unit 15 after the passing switch 9 or the high/low changeover switch 8 is operated to shift to the manual mode control during the auto mode control, the auto mode-returning unit 16 returns control of the light distribution of the headlight lamp bodies 2L and 2R to the auto mode control.

In addition, the controller 12 includes a non-operation time-determining unit 17 and a non-operation travel distance determining unit 18. The non-operation time-determining unit 17 determines whether a non-operation time during which the passing switch 9 or the high/low changeover switch 8 is not continuously operated is more than or equal to a threshold time. The non-operation travel distance determining unit 18 determines whether a travel distance of an own vehicle during non-operation of the passing switch 9 or the high/low changeover switch 8 is more than or equal to a threshold distance.

The auto mode-returning unit 16 returns the light distribution of the headlight lamp bodies 2L and 2R from the manual mode control to the auto mode control when the non-operation time is determined to be more than or equal to the threshold time by the non-operation time-determining unit 17 after the passing switch 9 or the high/low changeover switch 8 is operated to shift to the manual mode control during the auto mode control or also when the travel distance of the own vehicle is determined to be more than or equal to the threshold distance by the non-operation travel distance determining unit 18.

Figure 2:
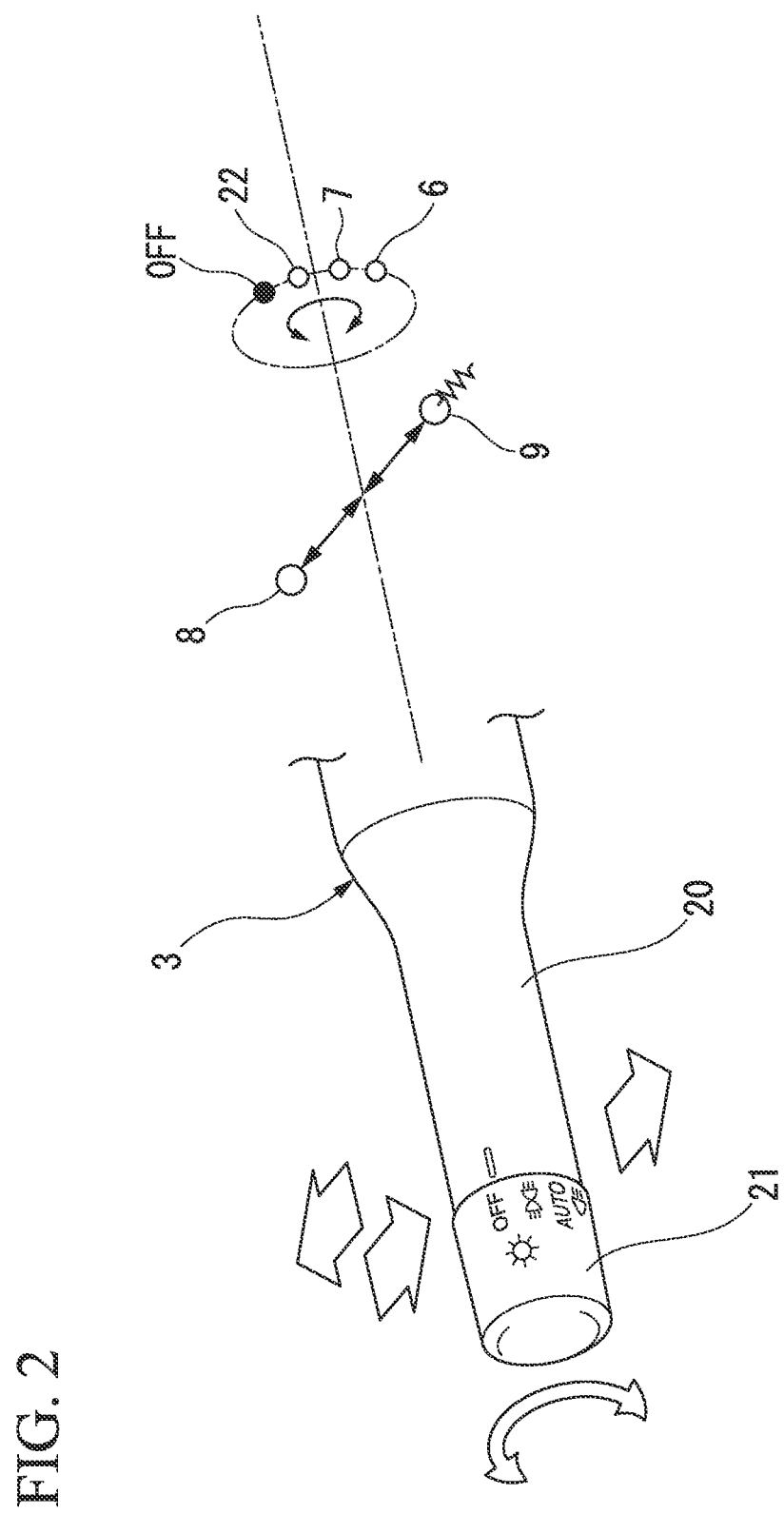
FIG. 2 is a schematic configuration diagram illustrating a switch lever of a vehicle headlight according to an embodiment of the present invention.

In FIG. 2, switches and so on mounted in the switch lever 3 are illustrated in detail.

As illustrated in FIG. 2, the switch lever 3 includes a lever main body 20 that is laterally projected from a steering box which is not illustrated and a rotation operator 21 that is provided at a distal end of the lever main body 20 so as to be rotatably operated. The lever main body 20 is tiltingly operable in the front and rear direction of a vehicle body. In rotating positions of a plurality of stages in the rotation operator 21, a small lamp lighting switch 22, the auto mode changeover switch 7, and the main lighting switch 6 are respectively allocated.

In addition, the lever main body 20 allocate a high beam changeover unit of the high/low changeover switch 8 in a tilting position at which the lever main body 20 is turned forward from a neutral position, and allocate the passing switch 9 in the tilting position at which the lever main body 20 is turned rearward from the neutral position. The passing switch 9 has a momentary mechanism, and is configured so as to self-return to the neutral position when a driver terminates a passing operation (operation of pulling) and removes his or her hands from the switch lever 3.

In addition, when performing low beam lighting at the time of manual mode control, the main lighting switch 6 is turned on while the lever main body 20 is maintained in the neutral position (high/low changeover switch 8 is maintained in a low side position). In addition, when performing high beam lighting at the time of manual mode control, the main lighting switch 6 is turned on, and the lever main body 20 is tiltingly operated to the front side.

Hereinafter, a control method of the headlight lamp bodies 2L and 2R by the light distribution-controlling device 10 will be described according to flowcharts of FIGS. 3 and 4.

Figure 3:
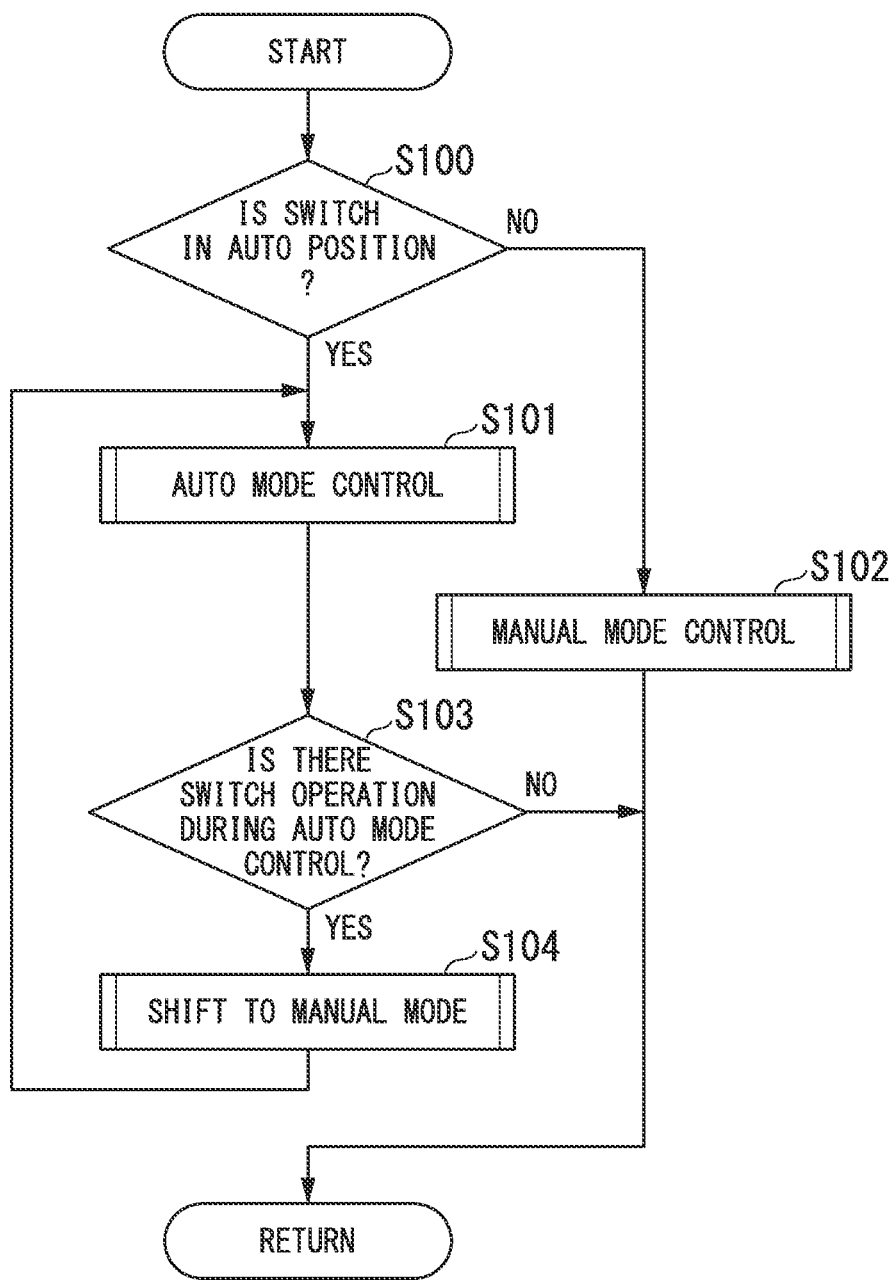
FIG. 3 is a flowchart illustrating a flow of control of a light distribution-controlling device according to an embodiment of the present invention.

FIG. 3 illustrates a main flow of control by the light distribution-controlling device 10.

In step S100 of FIG. 3, whether the auto mode changeover switch 7 is in an ON state is determined. Here, when the determination result is Yes, the corresponding step proceeds to step S101 to execute an auto mode control, and when the determination result is No, the corresponding step proceeds to step S102 to execute a manual mode control.

In the auto mode control of step S101, control of light distribution of the headlight lamp bodies 2L and 2R is performed based on signals of the imaging camera 11 as described above. Next, in step S103, whether the passing switch 9 or the high/low changeover switch 8 is operated at the time of auto mode control is determined. Here, when the determination result is Yes, the corresponding step proceeds to step S104 to shift to the manual mode control, and when the determination result is No, the corresponding step returns.

In step S104, when the control of light distribution is shifted to the manual mode control, the manual mode control continues to be executed until a return condition which will be described later is satisfied, and the corresponding step returns to step S101 when the return condition is satisfied.

Figure 4:
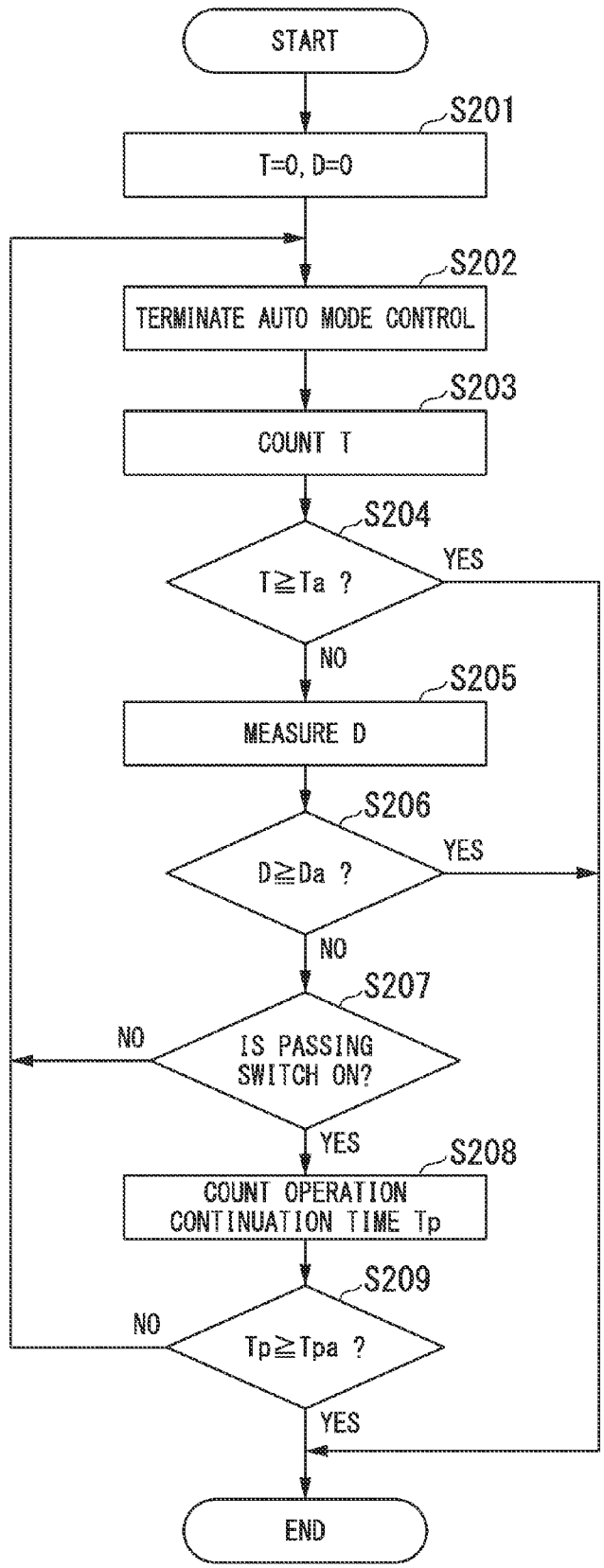
FIG. 4 is a flowchart illustrating a flow of control of a light distribution-controlling device according to an embodiment of the present invention.

FIG. 4 illustrates a process after the control of the light distribution is shifted to the manual mode control of step S104 of FIG. 3.

In step S201 of FIG. 4, a count value T of a non-operation time used in the non-operation time-determining unit 17 and a travel distance D used in the non-operation travel distance determining unit 18 are reset. Next, in step S202, the auto mode control is terminated.

In step S203, the non-operation time T of the passing switch 9 or the high/low changeover switch 8 is counted. Next, in step S204, whether the counted non-operation time T is more than or equal to a threshold time Ta is determined. Here, when the determination result is Yes, the corresponding process is terminated to return to step S101 of FIG. 3, and when the determination result is No, the corresponding step proceeds to step S205.

In step S205, a travel distance D of an own vehicle after proceeding to step S201 is measured. Next, in step S206, whether the measured travel distance D is more than or equal to a threshold distance Da is determined. Here, when the determination result is Yes, the corresponding process is terminated to return to step S101 of FIG. 3, and when the determination result is No, the corresponding step proceeds to step S207.

In step S207, whether the passing switch 9 is in an ON state is determined. Here, when the determination result is Yes, the corresponding step proceeds to step S208 to count an operation continuation time Tp of the passing switch 9, and when the determination result is No, the corresponding step returns to step S202.

When the step proceeds from step S208 to step S209, whether the operation continuation time Tp becomes more than or equal to a threshold continuation time Tpa is determined. Here, when the determination result is Yes, the corresponding process is terminated to return to step S101 of FIG. 3, and when the determination result is No, the corresponding step returns to step S202.

Accordingly, in the light distribution-controlling device 10, when the passing switch 9 or the high/low changeover switch 8 is operated to shift to the manual mode control during the auto mode control, control of the light distribution is returned to the auto mode control at the time when any one of the following conditions (a) to (c) is satisfied.

Figure 5:
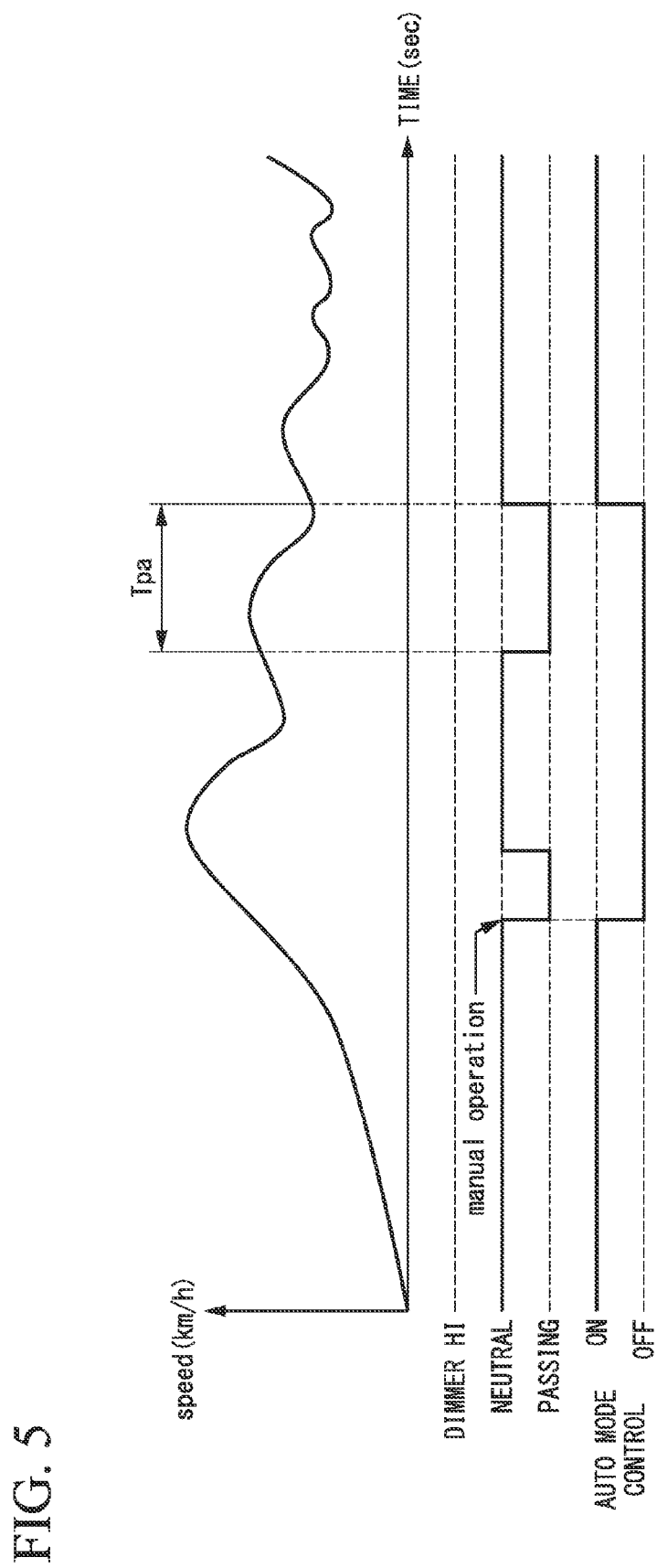
FIG. 5 is a chart diagram illustrating control of a light distribution-controlling device according to an embodiment of the present invention.

(a) when the operation continuation time Tp of the passing switch 9 is more than or equal to the threshold continuation time Tpa (b) when the non-operation time T of the passing switch 9 or the high/low changeover switch 8 is more than or equal to the threshold time Ta (c) when the travel distance D of the own vehicle during non-operation of the passing switch 9 or the high/low changeover switch 8 is more than or equal to the threshold distance Da FIG. 5 illustrates a chart diagram in a case in which control of light distribution is shifted to manual mode control by a passing operation of a driver while a vehicle is traveling with the auto mode changeover switch 7 turned on, and then control of light distribution returns to the auto mode control by continuous operation of which an operation continuation time Tp is more than or equal to a threshold continuation time Tpa of the passing switch 9 (corresponding to (a)).

Figure 6:
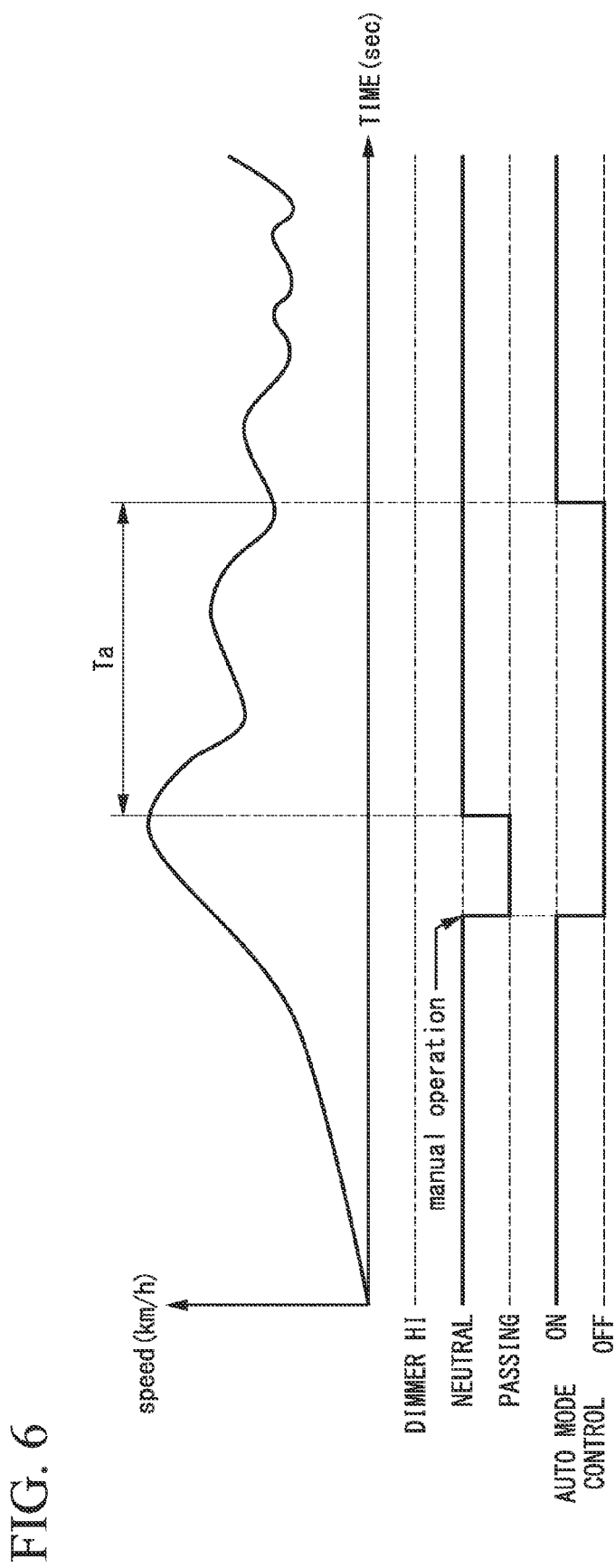
FIG. 6 is a chart diagram illustrating control of a light distribution-controlling device according to an embodiment of the present invention.
Figure 7:
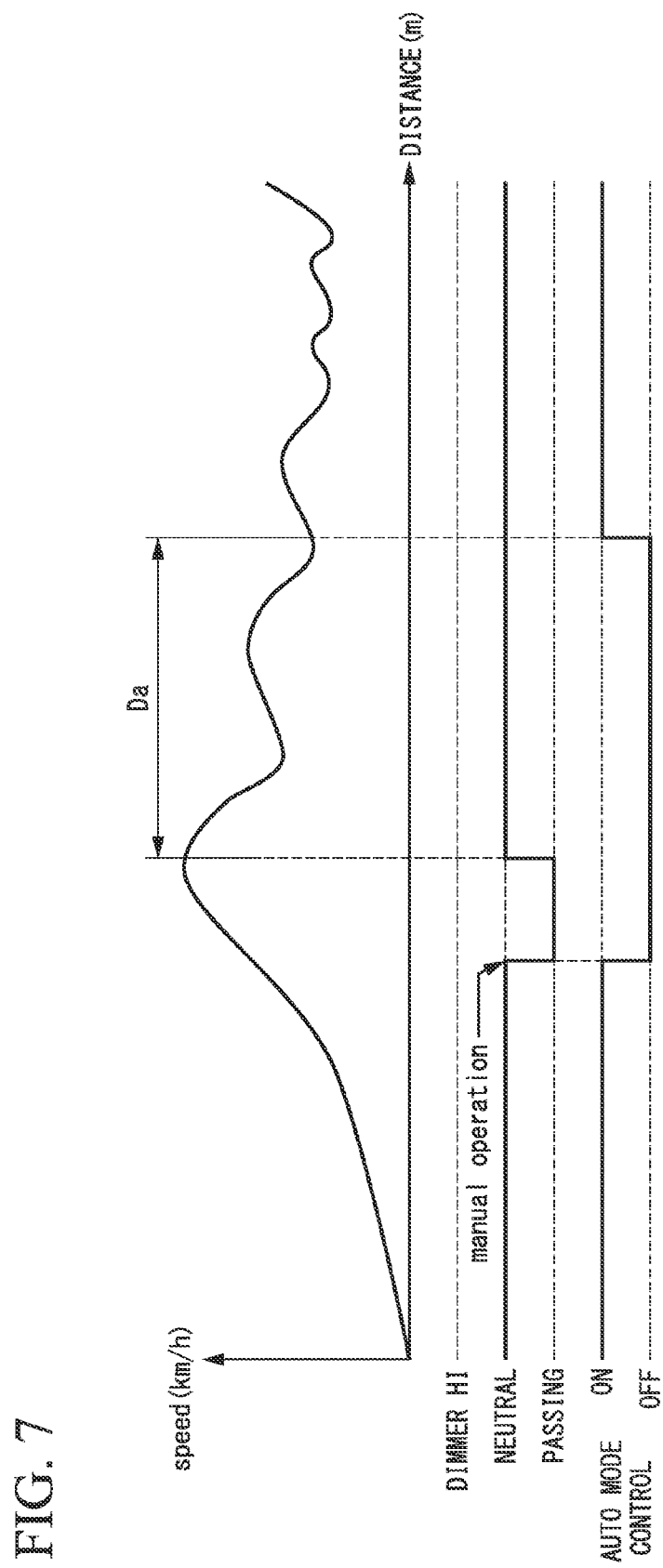
FIG. 7 is a chart diagram illustrating control of a light distribution-controlling device according to an embodiment of the present invention.

FIG. 6 illustrates a chart diagram in a case in which control of light distribution is shifted to manual mode control by the passing operation of the driver while a vehicle is traveling with the auto mode changeover switch 7 turned on, and then a non-operation time T of the passing switch 9 or the high/low changeover switch 8 is more than or equal to a threshold time Ta, thereby automatically returns to the auto mode control (corresponding to (b)).

In addition, a chart diagram in a case in which control of light distribution is shifted to manual mode control by the passing operation of the driver while a vehicle is traveling with the auto mode changeover switch 7 turned on, and then a travel distance D of an own vehicle is more than or equal to a threshold distance Da during non-operation of the passing switch 9 or the high/low changeover switch 8, thereby automatically returns to the auto mode control (corresponding to (c)) is illustrated.

In addition, in the light distribution-controlling device 10, the threshold continuation time Tpa, the threshold time Ta, and the threshold distance D which are conditions of returning from the manual mode control to the auto mode control may be arbitrarily changed by dedicated operation equipment without being fixed to a certain value. By doing this, it is possible to adapt the return conditions to the preference of the driver.

As described above, in the light distribution-controlling device 10, the auto mode-returning unit 14 that returns control of light distribution of the headlight lamp bodies 2L and 2R from the manual mode control to the auto mode control, when the passing switch 9 is continuously operated for the threshold continuation time Tpa or more, is provided. Therefore, it is possible to return to the auto mode control by a significantly simple operation without requiring complex operation by a driver.

In addition, in the light distribution-controlling device 10, when a non-operation time T during which the passing switch 9 or the high/low changeover switch 8 is not continuously operated is more than or equal to the threshold time Ta, the auto mode-returning unit 14 automatically returns the light distribution of the headlight lamp bodies 2L and 2R from the manual mode control to the auto mode control. Therefore, it is possible to further reduce the driver's labor and time for operation.

In addition, in the light distribution-controlling device 10, when a travel distance D of an own vehicle is more than or equal to a threshold distance Da during non-operation of the passing switch 9 or the high/low changeover switch 8, the auto mode-returning unit 14 automatically returns the light distribution of the headlight lamp bodies 2L and 2R from the manual mode control to the auto mode control. Therefore, it is possible to further reduce the driver's labor and time for operation. However, conditions of automatically returning from the manual mode control to the auto mode control by the auto mode-returning unit 14 may adopt any one of the non-operation time and the travel distance during the non-operation time.

In addition, the technical scope of the present invention may not be limited to the above-described embodiment, and may be variously modified without departing from the spirit of the present invention.

INDUSTRIAL APPLICABILITY

The present invention may be applicable to the light distribution-controlling device of a vehicle headlight that may easily return to the auto mode control without requiring a complicated operation after the control of light distribution is switched from the auto mode control to the manual mode control by the manual operation of the light distribution operation switch during the auto mode control.

What is claimed is:

1. A light distribution-controlling device of a vehicle headlight, comprising:
   a headlight lamp body that switches light distribution to any one of a low beam state and a high beam state;
   a switch lever that is configured to switch light distribution of the headlight lamp body by a driver's operation, the switch lever having a high/low changeover switch and a passing switch, the switch lever having a momentary mechanism to self-return to a neutral position when the switch lever is released, terminating a passing operation, the passing operation being a pulling and holding operation of the switch lever, the high/low changeover switch maintaining a high beam lighting or a low beam lighting even when the switch lever is released, the passing switch changing the low beam lighting to the high beam lighting and maintaining the high beam lighting only while the passing operation is performed;
   a front detection unit that detects an object in front of a vehicle;
   a manual mode control unit that controls the light distribution of the headlight lamp body based on a signal output from the light distribution operation switch;
   an auto mode control unit that controls the light distribution of the headlight lamp body based on a signal output from the front detection unit;
   an auto mode changeover switch that switches control of the light distribution of the headlight lamp body to control by the auto mode control unit by the driver's operation;
   a passing continuation-determining unit that determines whether a continuation time is more than or equal to a threshold continuation time, the continuation time being a time for which the passing operation is maintained; and
   an auto mode-returning unit that changes the control of the light distribution by the manual mode control unit to the control of the light distribution by the auto mode control unit when the continuation time is determined to be more than or equal to the threshold continuation time by the passing continuation-determining unit and keeps the control of the light distribution by the manual mode control unit when the continuation time is determined to be less than the threshold continuation time by the passing continuation-determining unit after the control of the light distribution by the auto mode control unit is switched to control of the light distribution by the manual mode control unit by an operation on the light distribution operation switch in a case in which the auto mode changeover switch is in an ON state.

2. The light distribution-controlling device of the vehicle headlight, according to claim 1, further comprising:

a non-operation time-determining unit that determines whether a non-operation time during which the light distribution operation switch is not continuously operated is more than or equal to a second threshold time, wherein the auto mode-returning unit changes the control of the light distribution to the control by the auto mode control unit when the non-operation time is determined to be more than or equal to the second threshold time by the non-operation time-determining unit after the control of the light distribution by the auto mode control unit is switched to the control of the light distribution by the manual mode control unit by the operation on the light distribution operation switch in the case in which the auto mode changeover switch is in the ON state.

3. The light distribution-controlling device of the vehicle headlight according to claim 1, further comprising:

a non-operation travel distance determining unit that determines whether a travel distance of the vehicle while the light distribution operation switch is not operated is more than or equal to a threshold distance, wherein the auto mode-returning unit changes the control of the light distribution to the control by the auto mode control unit when the travel distance is determined to be more than or equal to the threshold distance by the non-operation travel distance determining unit after the control by the auto mode control unit is switched to the control of the light distribution by the manual mode control unit by the operation on the light distribution operation switch in the case in which the auto mode changeover switch is in the ON state.

4. The light distribution-controlling device of the vehicle headlight according to claim 2, further comprising:

a non-operation travel distance determining unit that determines whether a travel distance of the vehicle while the light distribution operation switch is not operated is more than or equal to a threshold distance, wherein the auto mode-returning unit changes the control of the light distribution to the control by the auto mode control unit when the travel distance is determined to be more than or equal to the threshold distance by the non-operation travel distance determining unit after the control by the auto mode control unit is switched to the control of the light distribution by the manual mode control unit by the operation on the light distribution operation switch in the case in which the auto mode changeover switch is in the ON state.

* * * * *